Patented Oct. 9, 1951

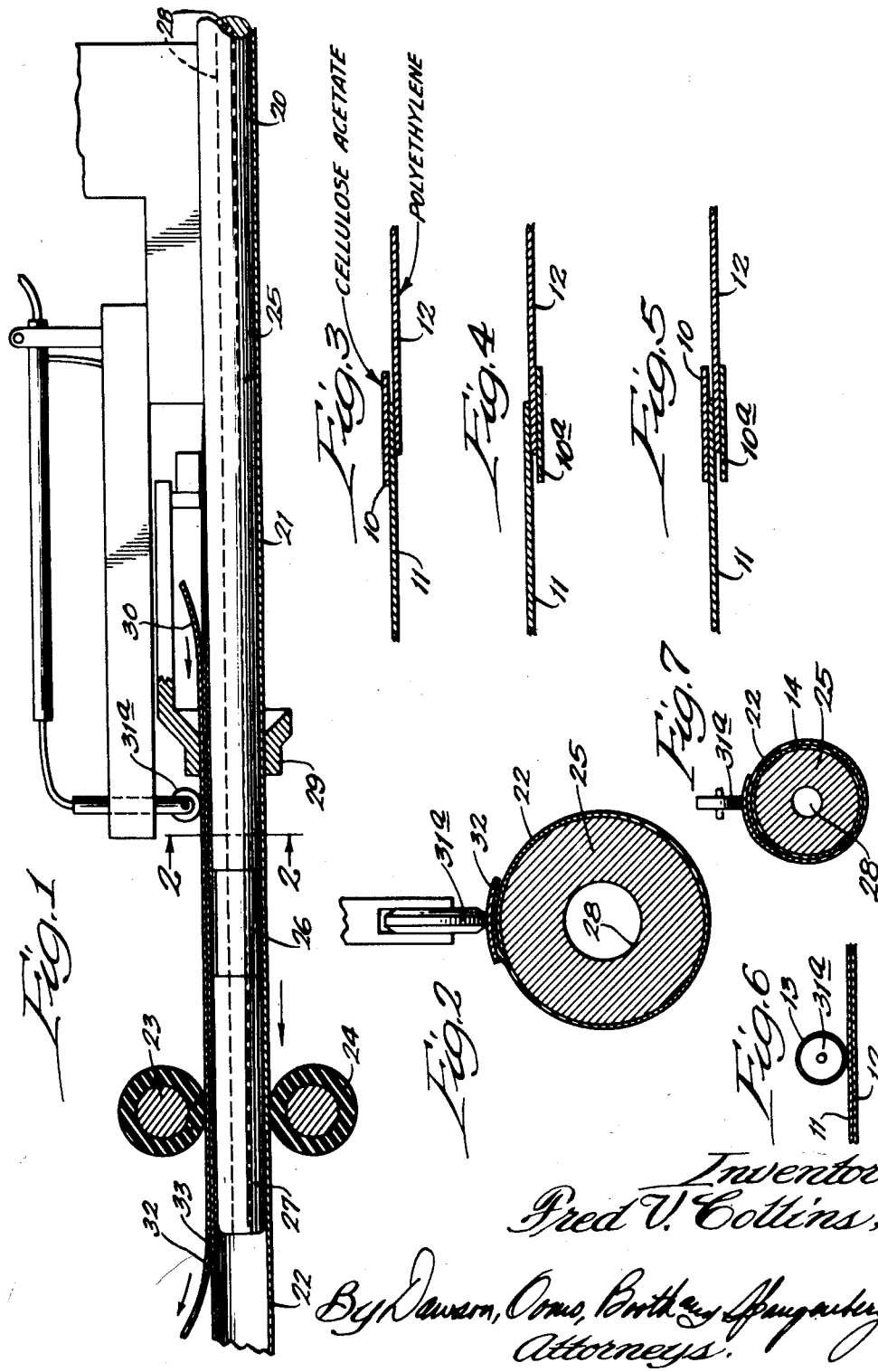

2,570,921

UNITED STATES PATENT OFFICE 2,570,921

ELECTRONIC HEATING OF MATERIALS

Fred V. Collins, Des Plaines, Ill., assignor to William F. Stahl, Kenilworth, Ill.

Application December 16, 1947, Serial No. 792,064

1 Claim. (Cl. 154—126.5)

This invention relates to electronic heating of materials and particularly to the heating of plastic materials of low power factor under the influence of high frequency.

This invention relates further to the employment of electronic means in the heat sealing of thermoplastic resinous containing materials such as plastic sheets, films and the like and the production therefrom of such fabrications as tubing.

The many advantages of heating and preheating plastic materials by electronic methods to improve the quality and increase the rate of production of the plastic molded articles are well known to those acquainted with the plastic art. More recently, electronic heating methods have successfully been employed in the production of plastic articles from plastic sheet stock by methods generally referred to as heat sealing. Ready acceptance of such heating methods is attributed to the fact that heating takes place uniformly and quickly throughout the thickness of the plastic in such manner as will enable the mass production of a uniform and attractive product. This is in contrast to products manufactured by sealing methods heretofore employing externally applied surface heating or solvents for welding purposes.

Electronic heating is suitable for a large number of plastic materials, but there has existed an important group of resinous materials and plastics formed therefrom with which electronic heating was ineffective. These materials comprise a group having such low power factor and excellent electrical insulating characteristics that high frequency radio waves were unable to cause such molecular disturbance as will generate heat. For instance, polystyrene, polyethylene, and polytetrafluoroethylene heretofore have been difficult to heat under the influence of high frequency, thereby to handicap their use in many important applications. This fact is clearly illustrated in an article entitled "Heat Sealing of Thermoplastics," edited by Wiley D. Wegner, and published in the June 1946 issue of "Modern Plastics," wherein it is stated, "All thermoplastics do not heat seal by electronic heat methods. Polystyrene, for example, because of its electrical properties will not get hot enough to seal." This invention, therefore, has as its object the provision of a method and apparatus for rapidly heating materials of low power factor and good electrical insulating properties under the influence of high frequency.

Another object is to provide a method and apparatus for electronically heating resinous materials and plastics formed therefrom having a power factor below 0.001 as measured at 60, $10^3$, or $10^6$ cycles.

A further object is to provide a method and apparatus for heat sealing thermoplastics of low power factor under the influence of normal high frequency heating systems.

A still further object is to provide a method and apparatus for manufacturing tubing of thermoplastic sheet stock characterized by low power factor and employing electronic heat sealing in the manufacture.

These and other objects and advantages of this invention will hereinafter appear, and for purposes of illustration only, various embodiments of the invention are shown in the accompanying drawings, in which—

Figure 1 is a side elevational view of tube forming apparatus embodying the features of this invention; Fig. 2, a sectional elevational view taken along the line 2—2 of Fig. 1; and Figs. 3 to 7, inclusive, sectional elevational views illustrating possible arrangements of materials for carrying out this invention.

I have discovered that low power factor material, and especially resinous-containing material, such as plastics of low power factor, may be uniformly and rapidly raised to elevated temperatures by electronic means when the material to be heated is associated with a material of relatively high power factor while being subjected to the influence of high frequency radio waves.

Although heating may be effected with normal high frequencies ordinarily employed in electronic heating and drying systems, frequencies in the range of 200 to 300 megacycles are preferred. The desired wave frequency may, therefore, be directed through the material by conventional high frequency machines, such as a unit employing a pair of electrodes between which the materials to be heated are adapted to be disposed. Alternatively, a machine employing a wave guide may be employed for directing the radio waves through the material. A machine of the latter type is fully described in my copending application, Serial No. 751,693, dated June 2, 1947, now abandoned.

I have discovered further that such high frequency heating means for low power factor materials may be employed to raise the thermoplastic material of low power factor to fusion temperature enabling an excellent weld to be achieved between the adjacent fused bodies with or without the use of externally applied forces to press the bodies together.

By a material of low power factor, as used herein, is meant materials having a power factor less than 0.001 as measured at 60 cycles, $10^3$ cycles, or $10^6$ cycles. This invention is particularly suitable for use with such plastic materials as polystyrene, polyethylene, polytetrafluoroethylene and the like in granular, sheet or molded form and with or without modifying agents, such as fillers, plasticizers and the like. Materials of the type described heretofore have been relatively unaffected by high frequency, perhaps because such heat generating means has been ineffective for causing such molecular disturbance as will generate heat within the plastic.

Illustrative of suitable resinous materials of high power factor are the phenol-aldehydes, including the reaction products of phenol, cresol, resorcinol, xylenol and the like with an aldehyde such as furfuraldehyde or formaldehyde; nitrogenous-aldehyde resin forming materials, such as the reaction products of urea, melamine, guanidine and the like with an aldehyde; polyallylic compounds and copolymers thereof; polyacrylates and polyalkylacrylates, cellulose esters such as cellulose acetate, cellulose butyrate, cellulose propionate; cellulose ethers, polyvinyl compounds such as polyvinyl acetate, polyvinyl chloride, vinyl chloride-vinyl acetate copolymers and polyvinyl acetals; and other synthetic and natural resinous substances including elastomers. Characteristic of these resinous materials and plastics formed therefrom is a power factor greater than 0.005, exceptional results having been obtained with resinous materials having a power factor greater than 0.01 as measured at 60, $10^3$, and $10^6$ cycles.

While some heating-up results merely from the interposition of the material of high power factor into the path of the high frequency radio waves directed through the material to be heated, exceptionally rapid and uniform heating is secured when the high power factor material is in direct contact with the material to be heated. Thus, these materials may be employed in various granular or molded forms, but best results have been obtained when they are used in the form of layers or films capable of covering the area through which the radio waves are directed. Figs. 3 to 7 in the drawings are illustrative of the various arrangements that may be effected in order to secure the desired results. Fig. 3, for example, shows a cellulose-acetate film 10 of relatively high power factor superimposed on the overlapping edge portions of sheets 11 and 12 of polyethylene of low power factor to be heated. As illustrated in Fig. 4, instead of arranging the cellulose-acetate film on the top side of the edge portions to be welded or heated, the film 10a may be disposed on the underside so as to be arranged between the material to be heated and the other of the electrodes. Alternatively, films of high power factor 10 and 10a may be disposed on both sides of the material to be heated during disposition thereof between the electrodes, as illustrated in Fig. 5. Positive results have also been obtained when the dielectric material of high power factor is arranged as a film or coating 13 over one of the electrodes, as illustrated in Fig. 6, or, as shown in Fig. 7, the film may be in the form of an envelope 14 for an electrode, such as a mandrel of a tube forming machine, which will hereinafter be described in greater detail. Heating has been obtained with the use of coatings or films of about two to five mils thickness. However, it is preferable to employ sheet stock ranging from 25 to 250 mils thickness, it being understood that even greater film thickness may be used if the economics and method of handling permit.

When employing films, layers or other forms of high power factor materials in direct contact with the material of low power factor to be heated, it is desirable that the material of high power factor be non-adherent to the material to be heated so as to be separable therefrom. Non-adherence at elevated temperatures is desired if the material of high power factor forms a part of one of the electrodes, it being sufficient if non-adherence is evident only at low temperatures if the material of high power factor is arranged to travel with the material to be heated so as to enable their subsequent separation.

It is difficult to assign any reason for this peculiar and unexpected behavior derived from mere positioning a material of high power factor adjacent the material of low power factor to be heated during the passage therethrough of high frequency radio waves. It is evident, however, that by the described arrangement, low factor materials heretofore unaffected by high frequency radio waves are rapidly and uniformly heated to elevated temperatures and even fusion temperatures.

The described method of electronic heating of high power factor resin-containing materials enables the use of improved heat sealing methods in the production of tubing from sheet stock or webs employing thermoplastic materials of low power factor as the resinous component. For a description of the improved method for manufacturing such tubing of thermoplastic sheet stock, reference is made to Figs. 1 and 2 of the drawings wherein 20 designates a mandrel toward which sheet stock 21 is fed to form a tube 22. The formed tube is drawn forward and discharged from the free end of the mandrel by rollers 23 having resilient tires 24 mounted thereon.

The mandrel is divided into three sections 25, 26, and 27 having an aperture 28 extending lengthwise therethrough for venting the tubing as it is withdrawn. Section 25 is formed of electric conductive materials and comprises the cold electrode of the electronic heating system, and section 26 is formed of dielectric insultaing material to confine the electric circuit to the part 25.

Reference is now made to my copending application entitled "Tube-Forming Device," Serial No. 736,760, now Patent No. 2,484,076, for a description of the illustrated electronic heating system and the means for folding the sheet stock into a tube on the mandrel. Suffice it to say that the web or sheet stock is folded about the mandrel and before it passes through the folder 29, where folding is completed, a strip of plastic 30 selected from the materials described of relatively high power factor is superposed on the overlapping edge portions 31 and 32 that are to be welded. In this instance, the assembly is in the form illustrated in Fig. 3 wherein the edge portions 31 and 32 correspond to the layers 11 and 12, and the plastic strip 30 corresponds to the layer 10. The assembled layers pass through the folder 29 and under the electronic foot 31a, illustrated as a roller, for directing high frequency radio waves through the layers causing the generation of sufficient heat to raise the material in edge portions 31 and 32 to fusion temperature. In the illustrated embodiment, the foot is mounted resiliently to press the fused material together to aid in the welding. However, satisfactory welds have been obtained without such externally applied forces. After welding has taken place, the superposed plastic layer 30 is separated from the formed tubing, as at 33.

As previously pointed out, instead of providing a layer 30 of high power factor material to be disposed between the material to be welded and one of the electrodes, the foot itself may be provided with a film or layer 13 of resinous material of high power factor, as illustrated in Fig. 6, or the mandrel may be provided with a sleeving 14 of such high power factor material, as illustrated in Fig. 7. Positive results with respect to heating and heat sealing have also been obtained with electrodes comprising stationary or reciprocable symmetrically shaped platens, such as rectangular bars between which the materials to be heated are disposed.

It will be evident from the description that I have introduced a new and improved method and apparatus for rapidly and uniformly heating by high frequency radio waves materials, and especially plastic materials, which heretofore have been unaffected by such high frequency systems. In addition, I have provided methods and apparatus for electronically heat sealing such plastic materials of low power factor, and more particularly I have produced a method and apparatus for forming tubing on a mass production basis of such resinous materials of low power factor.

It will be understood that numerous changes in the details of construction, arrangement, and operation may be effected without departing from the scope of the invention, especially as defined in the following claim.

I claim:

The method of forming plastic tubing of thermoplastic sheet stock of low power factor comprising the steps of folding the sheet stock into the form of a tube with overlapping edge portions, providing a layer of thermo-setting plastic material of high power factor on at least one of the outer walls of the overlapping edge portions while directing high frequency radio waves therethrough to effect the fusion and weld of the overlapping edge portions, and separating the high power factor material from the welded product.

FRED V. COLLINS.

REFERENCES CITED

The following references are of record in the file of this patent:

UNITED STATES PATENTS

| Number | Name | Date |
|---|---|---|
| 2,358,455 | Hallman | Sept. 19, 1944 |
| 2,401,991 | Walton | June 11, 1946 |
| 2,424,558 | Delano | July 29, 1947 |
| 2,457,659 | Graham | Dec. 28, 1948 |
| 2,458,563 | Collins | Jan. 11, 1949 |
| 2,459,260 | Brown | Jan. 18, 1949 |
| 2,463,054 | Quayle et al. | Mar. 1, 1949 |

OTHER REFERENCES

Hoyler, An Electronic "Sewing Machine," August 1943 issue of Electronics (7 pp.).